US010273000B2

(12) United States Patent
Wagner et al.

(10) Patent No.: US 10,273,000 B2
(45) Date of Patent: Apr. 30, 2019

(54) CONTROL OF IMAGE TRIGGERING FOR AERIAL IMAGE CAPTURING IN NADIR ALIGNMENT FOR AN UNMANNED AIRCRAFT

(71) Applicant: LEICA GEOSYSTEMS AG, Heerbrugg (CH)

(72) Inventors: Rüdiger J. Wagner, Oberriet (CH); Michael Naderhirn, Linz (AT)

(73) Assignee: LEICA GEOSYSTEMS AG, Heerbrugg (CH)

(*) Notice: Subject to any disclaimer, the term of this patent is extended or adjusted under 35 U.S.C. 154(b) by 416 days.

(21) Appl. No.: 14/781,540

(22) PCT Filed: Apr. 3, 2014

(86) PCT No.: PCT/EP2014/056715
§ 371 (c)(1),
(2) Date: Sep. 30, 2015

(87) PCT Pub. No.: WO2014/161945
PCT Pub. Date: Oct. 9, 2014

(65) Prior Publication Data
US 2016/0133019 A1    May 12, 2016

(30) Foreign Application Priority Data

Apr. 5, 2013 (EP) .................................... 13162632

(51) Int. Cl.
*B64C 39/02* (2006.01)
*H04N 5/232* (2006.01)
(Continued)

(52) U.S. Cl.
CPC ............. *B64C 39/024* (2013.01); *B64D 47/08* (2013.01); *G01C 11/02* (2013.01); *G03B 15/006* (2013.01);
(Continued)

(58) Field of Classification Search
USPC .................................................. 386/227–228
See application file for complete search history.

(56) References Cited

U.S. PATENT DOCUMENTS 5,489,907 A * 2/1996 Zink ...................... G01C 11/00
                                                            342/25 C
7,804,996 B2   9/2010 Ohtomo et al.
(Continued)

FOREIGN PATENT DOCUMENTS

CN        1712891 A   12/2005
CN      101976429 A    2/2011

*Primary Examiner* — Hung Q Dang
(74) *Attorney, Agent, or Firm* — Maschoff Brennan

(57) ABSTRACT

Method for aerial image capturing by means of an unmanned and controllable aircraft comprising a camera, more particularly a drone, during a flight maneuver of said aircraft, comprising continual determining of a camera position and alignment of an optical camera axis and acquiring of a series of aerial images. For each aerial image of said aerial image series, the capturing of the respective aerial image is triggered by flying through a respective image trigger region with said aircraft, wherein the location of said respective image trigger region is determined at least in each case by one trigger position assigned to said respective image trigger region and triggered subject to the alignment of the camera axis when flying through said respective image trigger region, with respect to fulfilling a defined, maximum angle deviation relative to a predetermined spatial alignment.

20 Claims, 3 Drawing Sheets

(51) Int. Cl.
  *B64D 47/08* (2006.01)
  *H04N 7/18* (2006.01)
  *G08G 5/00* (2006.01)
  *G01C 11/02* (2006.01)
  *G03B 15/00* (2006.01)
  *G03B 17/38* (2006.01)
  *G03B 37/02* (2006.01)
  *G06T 7/30* (2017.01)

(52) U.S. Cl.
  CPC ............ *G03B 17/38* (2013.01); *G03B 37/02* (2013.01); *G06T 7/30* (2017.01); *G08G 5/003* (2013.01); *H04N 5/232* (2013.01); *H04N 5/23222* (2013.01); *H04N 7/183* (2013.01); *B64C 2201/123* (2013.01); *B64C 2201/127* (2013.01); *B64C 2201/14* (2013.01); *G06T 2207/10032* (2013.01)

(56) References Cited

U.S. PATENT DOCUMENTS

| | | |
|---|---|---|
| 2003/0048357 A1 | 3/2003 | Kain et al. |
| 2004/0105090 A1* | 6/2004 | Schultz .................. G01C 11/02 356/141.5 |
| 2005/0286757 A1* | 12/2005 | Zitnick, III .............. G06K 9/20 382/154 |
| 2008/0260237 A1* | 10/2008 | Savolainen .......... G06K 9/0063 382/154 |
| 2009/0097744 A1* | 4/2009 | Schultz ................ H04N 1/6083 382/167 |
| 2009/0141020 A1* | 6/2009 | Freund .................. G06T 11/001 345/419 |
| 2010/0008565 A1* | 1/2010 | Chien ....................... G06T 3/00 382/154 |
| 2010/0013927 A1* | 1/2010 | Nixon .................... G01C 11/06 348/144 |
| 2010/0171651 A1* | 7/2010 | Scheiber ............... G01S 7/2813 342/179 |
| 2010/0295855 A1* | 11/2010 | Sasakawa ............. G06T 3/0031 345/427 |
| 2012/0120069 A1 | 5/2012 | Kodaira et al. |
| 2013/0076862 A1 | 3/2013 | Ohtomo et al. |
| 2013/0100307 A1* | 4/2013 | Curcio ............... H04N 21/2187 348/222.1 |
| 2014/0064554 A1* | 3/2014 | Coulter ................ G06K 9/3216 382/103 |
| 2017/0131717 A1* | 5/2017 | Kugelmass .......... G05D 1/0088 |
| 2018/0002004 A1* | 1/2018 | Dekel ................ B64C 29/0033 |

* cited by examiner

CONTROL OF IMAGE TRIGGERING FOR AERIAL IMAGE CAPTURING IN NADIR ALIGNMENT FOR AN UNMANNED AIRCRAFT

FIELD OF THE INVENTION

Some embodiments of the invention may relate to a method for capturing aerial images, a control unit for an unmanned aerial image capture flight, and an unmanned aircraft.

BACKGROUND

Unmanned aircraft (UAV) according to the prior art are increasingly also used for civilian terrain capture and ground observation, in addition to military fields of use. In this case, a predetermined flight route is followed according to a flight plan, wherein a plurality of aerial images and data are captured mostly with a determined image capture frequency and a determined image overlap (adjacent images) along the route by means of a camera or an imaging sensor. Respective triggering points for the image capture are typically defined in the flight plan for this purpose.

In addition, position and alignment data for the aircraft are measured and linked to the respective captured images. The image triggering is triggered, for example, based on captured GPS position data or time data.

The entirety of the data captured during the flight are then processed in the scope of subsequent "post-processing" such that by way of suitable linkage of the images and calculation of the location data, a planar, stereophotogrammetric depiction of the captured terrain and, therefrom, an orthogonal product are created.

In particular light UAVs are very susceptible to wind and are unstable in this case, i.e., the respective location thereof can already be significantly influenced by a few strong gusts of wind or other external influences and changed in an indeterminate manner. The aerial images are thus not each captured with identical alignment or viewing angle of the aircraft, but rather each have an offset not only in the flight direction but rather also, for example, in a direction orthogonal to the flight direction (viewing direction).

Conventional UAVs do not actively consider or correct the spatial location of the system during the data recording and during the triggering of the image recording such that a uniform viewing direction could be guaranteed for the image capture thereby. This negatively impairs the accuracy of the post-processed data, up to resulting data gaps, for example, regions of the area to be surveyed which were not captured in images. Due to the images captured in this case having different viewing directions, the accuracy of the stereo image which can be created therefrom is reduced, for example, as a result of perspective distortions and reduced capability of generating linkage points between the individual images. These are necessary for accurate alignment of the stereo images and registration of the data with one another in the case of inaccurate GPS determination.

If the UAV is engaged by a gust of wind and thus strongly inclined, for example, in relation to a nadir alignment or horizontal alignment of the UAV, the desired terrain region thus cannot be captured in the case of an aerial image capture occurring at this time, but rather, depending on the deflection of the UAV, an adjacent region or even a region which has no overlap with previously captured images.

Such a data gap is usually closed by repeated overflights and further image capture of the relevant region, wherein this is relatively time-consuming.

SUMMARY

Some embodiments of the present invention may reduce or prevent the above-mentioned disadvantages with respect to accuracy and time consumption during aerial image recording.

The invention relates to a method for aerial image capture using an unmanned and controllable aircraft with camera, in particular a drone, during a flight movement of the aircraft, having a progressive determination of a camera position and an alignment of an optical camera axis and a capture of an aerial image series. For each image of the aerial image series, the capture of the respective aerial image is triggered as the aircraft flies through a respective image triggering region, wherein the location of the respective image triggering region is determined at least by in each case a triggering position, which is associated with the respective image triggering region, in a flight plan, and in dependence on the alignment of the optical camera axis during the flight through the respective image triggering region in regard to a fulfillment of a defined maximum angle deviation with respect to a predetermined spatial alignment (for the camera axis).

The flight of the aircraft through the respective image triggering region relates in particular to the position of the camera (or of the aircraft) with respect to the position of the image triggering region during the flight movement. As long as the presently determined camera position (aircraft position) is within this image triggering region, the flight through this region is taking place.

Since an unmanned aircraft (UAV) typically has comparatively weak motors, active adjustment of the location of the UAV can only be performed to a limited extent or not at all. By means of an inertial measuring unit (IMU) or other position measuring sensors, however, the location in space of the UAV and the camera provided on the UAV can be continuously determined.

The UAV flies over an area to be recorded according to the flight plan. In this case, the camera is triggered within the predetermined period of time. The location in space can be ascertained in "real time" in this case with the addition of the IMU measured data. If the UAV or camera axis (direction of the image capture using the camera) should deviate from a preferred alignment at the first possible triggering time (within the image triggering region) (for example, strong inclination instead of a nadir viewing direction or horizontal viewing direction of the camera), the triggering time is then delayed by a specific time.

A maximum number of aerial images can thus be obtained in the same viewing direction (for example, nadir) but with different position (with defined minimum overlap).

In particular, according to the invention, the image triggering region is defined by a predefined overlap range for two aerial images to be captured successively during the flight movement.

In this context, the overlap range corresponds in particular, according to the invention, to an image area between 50% and 90% of the aerial image, in particular an image area between 60% and 80% of the aerial image.

According to a special embodiment of the invention, the image triggering region is determined such that a minimum image overlap range, which is predetermined with respect to a flight route predefined by the flight plan, is defined for the two aerial images to be captured successively, in particular wherein the minimum image overlap range is maintained during the capture of the two aerial images to be captured successively.

In particular, the minimum image overlap range is, according to the invention, 60% of the image area of the aerial image in this case.

At a minimum overlap of 60% per stereo image, a safety factor of, for example, an additional 20% (a total of 80% overlap) of the image area can be taken into consideration in the flight planning and the image triggering region can be defined accordingly. If a triggering delay should then be necessary, the delay can be utilized within the 20% safety margin (=image triggering region) between minimum overlap and safety factor.

With respect to a further special embodiment of the invention, for the respective image triggering region, in dependence on the associated triggering position, a starting position and an end position are defined, in particular in dependence on the predefined overlap range, in particular with respect to the flight route predefined by the flight plan.

I.e., as soon as, during the flight movement, the boundaries of the field of vision for the image capture (the present positions of which are in turn derivable from the progressively determined camera position) correspond to the start position of the image triggering region until reaching a correspondence of the field of vision boundary with the end position, triggering of the aerial image capture can be performed according to the invention. These positions can be determined by measurement specifications, for example, permissible overlap of the images, positions of the triggering points in the flight plan, and/or setpoint location of the image triggering region in relation to the respective triggering point.

According to one special embodiment of the invention, the predetermined spatial alignment is a nadir alignment or a horizontal alignment of the camera axis. I.e., the aerial images are captured within the permissible angle range around the nadir alignment of the camera or around the horizontal alignment of the camera.

With respect to the flight planning, according to the invention, in particular the flight plan can define a plurality of triggering positions, wherein each triggering position defines a location of an image triggering region associated in each case for capturing a respective aerial image, in particular wherein the triggering positions defined by the flight plan are approached in flight in a controlled manner using the aircraft, in particular according to a predefined flight pattern, in particular in a meander.

According to one special embodiment of the invention, an update of the next triggering position of the aerial image series with regard to its position in the flight plan is performed in dependence on an actual capture time for the aerial image capture and/or on a present, actual camera position during the aerial image capture. A dynamic adaptation of the flight plan with respect to the already captured region parts and the region parts to be captured next can therefore be performed.

With respect to achieving the defined maximum angle deviation with respect to the predetermined spatial alignment, according to the invention, in particular a flight speed of the aircraft can be adapted, in particular wherein an available capture time window for the aerial image capture is enlarged by reducing the flight speed.

According to the invention, in particular in dependence on the fulfillment of the defined maximum angle deviation with respect to the predetermined spatial alignment as the aircraft flies through the image triggering region, a repeated approach flight of the triggering position associated with the image triggering region and capture of the aerial image at this triggering position can additionally be performed.

Furthermore, in the scope of the invention, the maximum angle deviation with respect to the predetermined spatial alignment can be 5°, in particular 2°.

The invention additionally relates to a control unit for an unmanned aerial image capture flight, which is designed to obtain position information, alignment information, and flight plan data for an unmanned aircraft. Furthermore, the control unit is designed to generate control signals for controlling a camera of the aircraft for aerial image capture such that the capture of each aerial image of an aerial image series can be triggered in a manner controlled based on the control signals if a camera position derivable from the position information is present inside a respective image triggering region derivable from the flight plan data, wherein the location of the respective image triggering region is determined at least by in each case a triggering position, which is associated with the respective image triggering region, according to the flight plan data, and in dependence on an alignment of an optical camera axis, which is derivable from the alignment information, in regard to a fulfillment of a defined maximum angle deviation with respect to a predetermined spatial alignment (for the optical camera axis).

Furthermore, the invention relates to a system made of a control unit according to the invention (according to the above embodiment), a camera, a memory, and a sensor unit for determining the camera position and alignment of the optical camera axis, in particular a GNSS receiving unit and inertial measuring unit. The position information and the alignment information can be determined and provided in this case by the sensor unit, the flight plan data can be provided by means of the memory, and the camera can be activated by means of the control signals, which can be generated by the control unit, for the aerial image capture.

Furthermore, the invention relates to an unmanned and controllable aircraft, in particular a drone, having an above system according to the invention. The aircraft has an aerial image capture functionality such that, during the execution thereof, controlled by the control unit during a flight movement of the aircraft, a capture of at least one aerial image as the aircraft flies through an image triggering region, wherein the location of the image triggering region is determined at least by a triggering position, which is associated with the image triggering region, in a flight plan, and in dependence on the alignment of the camera axis during the flight through the image triggering region in regard to a fulfillment of a defined maximum angle deviation with respect to a predetermined spatial alignment (for the optical axis of the camera).

According to a special embodiment of the invention, the control unit is designed such that a method according to the invention according to one of the above embodiments is executable using the aircraft.

Furthermore, the invention relates to a computer program product having program code which is stored on a machine-readable carrier or is embodied at least partially by an electromagnetic wave, for obtaining position information, alignment information, and flight plan data for an unmanned aircraft with camera and for controlling an aerial image capture in dependence on the position information, the alignment information, and the flight plan data, in particular in dependence on an alignment and position of the camera, in particular according to a method according to the invention, in particular when the program is executed on an electronic data processing unit designed as a control unit according to the invention.

BRIEF DESCRIPTION OF THE DRAWINGS

The method according to the invention and the device according to the invention will be described in greater detail solely as examples hereafter on the basis of concrete exemplary embodiments which are schematically illustrated in the drawings, wherein further advantages of the invention will also be described. In the specific figures.

DETAILED DESCRIPTION

Figure 1:
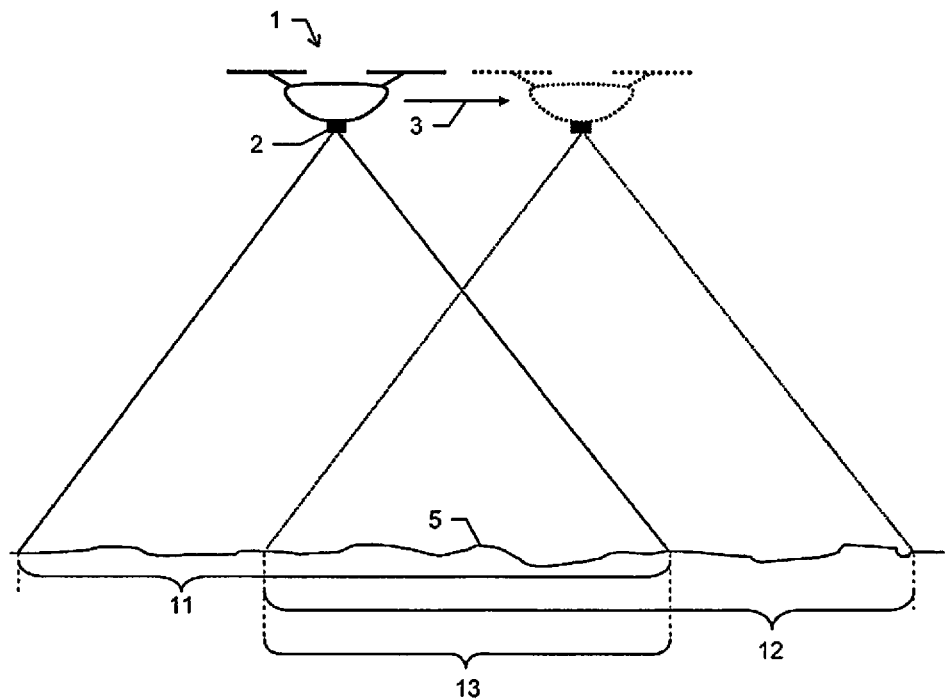
FIG. 1 shows a capture of aerial images using an unmanned aircraft according to the invention.

FIG. 1 shows an unmanned and controllable aircraft 1 (UAV) according to the invention, with a camera 2, wherein an image of a part of a terrain 5 to be captured is captured using the camera 2. The region 11 of the terrain 5 is therefore captured by the aerial image. The camera 2 is connected to the aircraft 1 rigidly and in a known relative position with respect to the UAV 1. A position and alignment for the UAV 1 is therefore substantially equivalent hereafter to a position and alignment of the camera 2.

The aircraft 1 has a position determination unit, by means of which the present position of the aircraft 1 or the camera 2 is progressively determined. This position determination unit is preferably designed as a GNSS receiving unit (for example, GPS, GLONASS, or Galileo), wherein GNSS position signals are captured and a position of the UAV 1 is derived based on these signals. In addition, the UAV 1 has an inertial measuring unit (IMU) for determining, in particular progressively, a present alignment of the aircraft 1 or the camera 2 (i.e., an optical axis of the camera). An inclination sensor, an acceleration sensor, a magnetic compass, and/or a rotation rate sensor can be provided for this purpose, for example.

The aircraft 1 moves along a predefined route (symbolized by the arrow 3). In this case, the position and the alignment of the aircraft 1 (the camera 2) are determined progressively. If the UAV 1 reaches a position for the capture of a next image, an aerial image is thus captured in accordance with the next terrain section 12. In this case, in dependence on the flight speed and the respective image triggering time, an overlap range 13 results for the terrain sections, i.e., a terrain region 13 which is captured by both aerial images.

According to the determined flight route, individual triggering points for the capture of aerial images of the terrain 5 are defined in dependence on the terrain to be captured, i.e., positions are determined for the aerial images to be captured of an aerial image series. These points are predefined so that in each case successively captured aerial images each have a determined image overlap range.

For example, two adjacent aerial images are to overlap in each case by at least 60% of the image area thereof. This enables reliable preparation of a stereo image of the respective terrain part on the basis of these two images.

An image triggering region is defined for each of these triggering points. It is selected according to the invention such that an image capture during a flight through this image triggering region (as long as, during the flight movement, the position of the aircraft 1 or the camera 2 is inside the image triggering region) ensures that the at least one required minimum overlap range is maintained.

Furthermore, the image triggering region is selected so that a safety region for the image capture is thus provided, i.e., a time window results, in which the image capture can be executed under the predefined measurement requirements. For example, a starting point is set for the image triggering region, which corresponds to an 80% image overlap (for two images to be captured in succession), and an endpoint is set, which corresponds to a 60% overlap, wherein the aerial image is to be captured for the triggering point (which is associated with the image triggering region) within these boundaries. The permissible time window for the aerial image capture results in this case in dependence on the flight speed of the aircraft.

Within the image triggering region or the permissible time window, i.e., during the flight through, the image capture for the relevant triggering point is triggered in dependence on whether the alignment of the optical axis of the camera 2 (optical camera axis) is within a predetermined angle range around a nadir alignment or a horizontal alignment for the camera axis. This alignment is determined by determining the alignment of the UAV 1 or the camera 2 by means of the provided IMU.

In other words, this means that an aerial image for a triggering point is captured during a flight through the associated image triggering region as soon as or if the camera alignment fulfills a maximum angle deviation with respect to a predetermined setpoint spatial direction (nadir alignment or horizontal alignment).

This method is based in particular on the fact that the actual trajectory for the UAV 1 is predominantly impaired by gusts of wind, but the UAV 1 generally trends towards a horizontal alignment. This automatically occurring movement is tracked by a "real time" (continuous) alignment measurement. In the event of a determined deviation from the setpoint alignment around the nadir alignment, the triggering of the aerial image is delayed upon entry into the image triggering region and performed if necessary (if the maximum setpoint angle deviation is fulfilled) at a later time within the resulting time window.

It is therefore ensured that for a series of aerial images, a maximum amount of recordings of identical or parallel viewing directions are generated, which make the subsequent "post-processing" substantially easier (with respect to rapidity and computing effort) and additionally increase the accuracy for the terrain depictions which can be generated therefrom.

Figure 2:
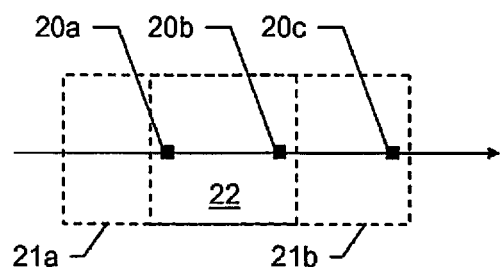
FIG. 2 shows triggering points of a flight plan and the terrain regions captured according to the invention at these respective triggering points.

FIG. 2 shows the triggering points 20a-c, which are defined by a flight plan, and the aerial images 21a-b, which are captured in each case at the triggering points 20a-b. The triggering points 20a-c are set so that in the case of an image capture precisely at the respective points 20a-c, a predetermined image overlap range 22 results for two successively captured images 21a-b, wherein this image overlap range 22 corresponds, for example, to an image area of 50% to 90% of the area of the aerial images 21a-b.

Figure 3:
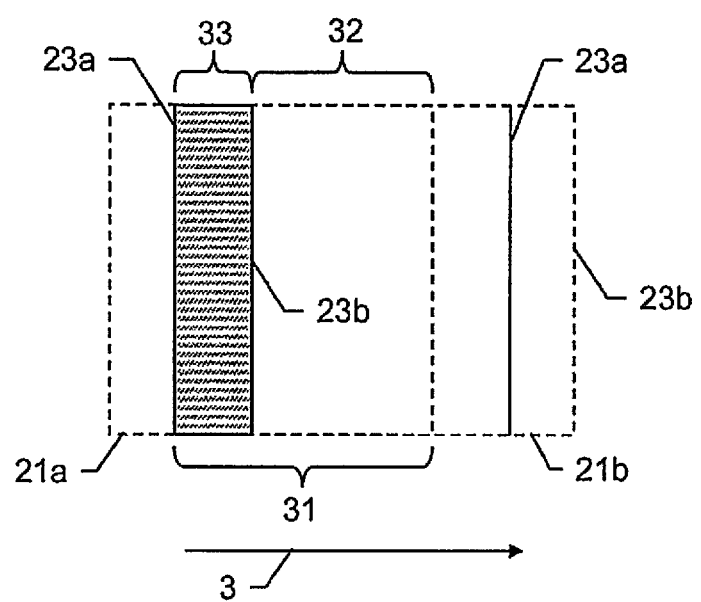
FIG. 3 shows the principle of a capture according to the invention of two overlapping aerial images.

FIG. 3 shows the principle of a capture according to the invention of two aerial images 21a-b during a flight movement of an aircraft according to the invention according to the direction represented by arrow 3.

Firstly, the image 21*a* has been captured in the flight of the UAV. During the further flight of the UAV, the field of vision of the camera shifts such that an image 21*b*, which is then captured at a later point in time, no longer has the identical capture region, in accordance with the shifted location of the field of vision, but rather the capture region of the images 21*a-b* partially overlaps, if the second image 21*b* is still captured in the scope of the predefined minimum overlap to be maintained.

According to the invention, an image triggering region 33 is defined for the capture of the aerial images 21*a-b*. This image triggering region 33 is defined by a predefined maximum overlap of the images 21*a-b*, for example, 90% to 80% of the respective image area, and by a minimum overlap of the images 21*a-b*, for example, 65% to 55% of the respective image area. The maximum overlap range 31 and the minimum overlap range 32 of the images 21*a-b* therefore define a permissible relative offset of the images 21*a-b* or of the aircraft, using which these images 21*a-b* are captured.

In the case of image triggering upon reaching the maximum overlap, i.e., upon reaching a position with the aircraft (the camera) such that the second image can be captured with such an overlap, the second image 21*b* is captured in the boundaries 23*a* with respect to the movement direction or flight route (according to the flight plan) of the aircraft. In the case of image triggering upon reaching the minimum overlap, the second image 21*b* is captured in the boundaries 23*b* with respect to the movement direction of the aircraft. The image capture is executable at any point (in time) within these boundaries.

Therefore, a route section with respect to the flight direction (flight route according to the flight plan) is additionally defined by the image triggering region 33, within which the aerial image capture can be performed. The aerial image capture is therefore performed according to the invention during the flight through this route section.

The location of the image triggering region 33 is furthermore determined by the position of the triggering point for the first image 21*a* or by the position of the aircraft existing during the capture of the first image 21*a*.

In addition, the image triggering region is dependent because of the system on the present altitude or the altitude predefined in the scope of the flight planning of the aircraft and on the field of vision of the camera.

A triggering time frame for the aerial image capture is predefined by the image triggering region 33 or overlap range to be maintained.

According to the invention, the alignment of the aircraft or the camera, i.e., the location of the aircraft in space, is additionally progressively determined and, in dependence on the respective alignment during the flight through the image triggering region 33, the capture of the aerial image is triggered. For this purpose, a predefined maximum angle deviation is to be fulfilled with respect to a predefined setpoint alignment (for example, nadir alignment 35) (cf. FIG. 4) of the capture direction (optical axis) of the camera.

Figure 4:
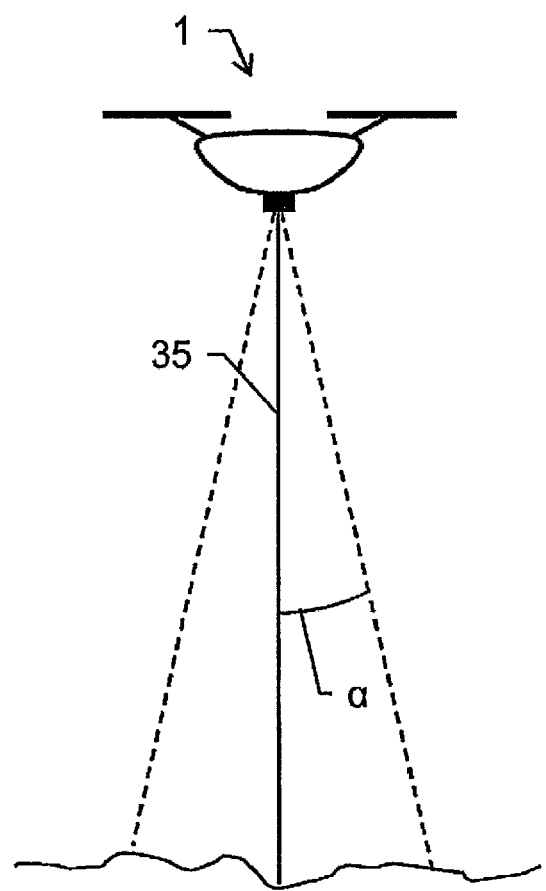
FIG. 4 shows an aircraft according to the invention and an angle range a, which is permissible with respect to the alignment of the aircraft, for the capture of an aerial image.

FIG. 4 shows, in this context, an aircraft 1 according to the invention and an angle range a, which is permissible with respect to the alignment of the aircraft 1, wherein in the event of an alignment of the camera of the aircraft 1 such that the capture direction of the camera is within this angle range a around the nadir alignment 35, triggering of the aerial image capture is performed during the flight through the image triggering region 33. The nadir alignment 35 corresponds in this case to the predetermined spatial alignment for the camera axis.

In other words, this means that the triggering of the aerial image capture is delayed in the event of an excessively large angle deviation upon reaching the image triggering region (entering the image triggering region during the flight movement). The delay is continued in this case until the alignment of the aircraft 1 corresponds to the defined measurement criteria (permissible angle range with respect to the nadir alignment). If these measurement criteria are achieved during the flight through the image triggering region, the image capture is thus triggered.

Aerial images of an aerial image series can thus be captured in each case having substantially parallel or identical alignment of the camera, whereby a significantly increased accuracy for a stereo terrain image generated therefrom is achieved and in addition the image processing effort required for this purpose can be kept comparatively low (since a significantly smaller number of images are thus to be processed).

The flight plan can be adapted in dependence on the actual triggering time or the actual position of the aircraft during the image capture. In particular, a position of a following triggering point or of the image triggering region for this point can be changed, for example, in the event of a strongly delayed triggering of the image recording (for example, triggering upon reaching a minimum overlap for the images to be maintained) so that, for the aerial image capture for this next triggering point, an image triggering region corresponding to the requirements (maintaining the overlap for the following aerial images) is provided.

Alternatively thereto, the respective following triggering point and the associated triggering region can be maintained with respect to position, whereby, for example, two immediately successive aerial image captures are performed (in the case of triggering delayed in turn for the first triggering point).

If, during the flight through the image triggering region, for example, a strong variation with respect to the determined alignment of the aircraft is established, so that the maximum angle deviation probably cannot be achieved within the image triggering region, the flight speed of the aircraft can thus be adapted (reduced), so that the time window for the image capture is thus changed (enlarged) and the probability of achieving the maximum angle deviation is increased. Such an adaptation of the flight speed can also be performed in dependence on other factors, for example, for terrain sections to be captured with increased accuracy.

If this angle criterion is not fulfilled during the flight through the region, in particular no aerial image is captured for the relevant triggering point and the aerial image capture is continued at the next triggering point. A gap thus resulting in the aerial image series can be closed according to the invention in that the aircraft is again flown (automatically) controlled in a targeted manner to the relevant triggering point and the image capture according to the invention is repeated with respect to this triggering point. The aerial image resulting in this case can be incorporated into the aerial image series.

It is obvious that the illustrated figures only schematically illustrate possible exemplary embodiments. According to the invention, the various approaches can also be combined with one another and with methods and devices for aerial image capture and unmanned aircraft of the prior art.

What is claimed is:

1. A control unit for use in an unmanned aircraft during an aerial image capture flight, the control unit comprising:
- a sensor unit configured for progressively determining a camera position and a real time alignment of an optical camera axis of a camera; and
- a memory device configured for providing flight plan data for the unmanned aircraft, wherein:

the control unit is configured to:
- obtain camera position information from the sensor unit;
- obtain alignment information from the sensor unit; and
- obtain flight plan data for the unmanned aircraft having the control unit from the memory device; and
- generate control signals for controlling the camera of the unmanned aircraft for aerial image capture such that the capture of each aerial image of an aerial image series is triggered in a manner controlled based on the control signals:

if a camera position derivable from the position information is present inside a respective image triggering region derivable from the flight plan data, wherein the location of the respective image triggering region is determined in each case at least by a triggering position, which is associated with the respective image triggering region, according to the flight plan data, and in dependence on the real time alignment of the optical camera axis, which is derivable from the alignment information, in regard to a fulfillment of a defined maximum angle deviation ($\alpha$) with respect to a predetermined spatial alignment, wherein no image is captured if the real time alignment is not within the defined maximum angle deviation ($\alpha$).

2. The control unit as claimed in claim 1, wherein:
the image triggering region is defined by a predefined overlap range for two aerial images to be captured successively during the flight movement, wherein the overlap range corresponds to an image area between 60% and 80% of the aerial image, wherein the two aerial images to be captured successively are obtained in the same viewing direction, wherein the two aerial images to be captured successively are obtained in the same viewing direction.

3. The control unit as claimed in claim 2, wherein:
the image triggering region is determined such that a minimum image overlap range, which is predetermined with respect to a flight route predefined by the flight plan, is defined for the two aerial images to be captured successively, wherein the minimum image overlap range is maintained during the capture of the two aerial images to be captured successively.

4. The control unit as claimed in claim 2, wherein:
the minimum image overlap range is 60% of the image area of the aerial image.

5. The control unit as claimed in claim 1, wherein:
the image triggering region is defined by a predefined overlap range for two aerial images to be captured immediately successive during the flight movement, wherein the overlap range corresponds to an image area between 50% and 90% of the aerial image.

6. The control unit as claimed in claim 1, wherein:
for the respective image triggering region, in dependence on the associated triggering position, a starting position and an end position are defined in dependence on the predefined overlap range.

7. The control unit as claimed in claim 1, wherein:
for the respective image triggering region, in dependence on the associated triggering position, a starting position and an end position are defined with respect to the flight route predefined by the flight plan.

8. The control unit as claimed in claim 1, wherein:
the predetermined spatial alignment is a nadir alignment or a horizontal alignment of the camera axis.

9. The control unit as claimed in claim 1, wherein:
the flight plan defines a plurality of triggering positions, wherein each triggering position defines a location of an image triggering region associated in each case for capturing a respective aerial image, wherein the triggering positions defined by the flight plan are approached in flight in a controlled manner using the aircraft.

10. The control unit as claimed in claim 1, wherein:
the flight plan defines a plurality of triggering positions, wherein each triggering position defines a location of an image triggering region associated in each case for capturing a respective aerial image, wherein the triggering positions defined by the flight plan are approached in flight in a controlled manner using the aircraft according to a predefined flight pattern.

11. The control unit as claimed in claim 1, wherein:
the flight plan defines a plurality of triggering positions, wherein each triggering position defines a location of an image triggering region associated in each case for capturing a respective aerial image, wherein the triggering positions defined by the flight plan are approached in flight in a controlled manner in a meander.

12. The control unit as claimed in claim 1, wherein:
in that an update of the next triggering position of the aerial image series with regard to its position in the flight plan is performed in dependence on:
a capture time for the aerial image capture; and/or
a present camera position during the aerial image capture.

13. The control unit as claimed in claim 1, wherein:
to achieve the defined maximum angle deviation (a) with respect to the predetermined spatial alignment, a flight speed of the aircraft is adapted, wherein an available capture time window for the aerial image capture is enlarged by reducing the flight speed.

14. The control unit as claimed in claim 1, wherein:
in dependence on the fulfillment of the defined maximum angle deviation (a) with respect to the predetermined spatial alignment as the aircraft flies through the image triggering region, a repeated approach flight of the triggering position associated with the image triggering region and capture of the aerial image at this triggering position are performed, and/or
the maximum angle deviation (a) with respect to the predetermined spatial alignment is 5°.

15. The control unit as claimed in claim 1, wherein:
in dependence on the fulfillment of the defined maximum angle deviation (a) with respect to the predetermined spatial alignment as the aircraft flies through the image triggering region, a repeated approach flight of the triggering position associated with the image triggering region and capture of the aerial image at this triggering position are performed, and/or
the maximum angle deviation (a) with respect to the predetermined spatial alignment is 2°.

16. A method for aerial image capture using an unmanned and controllable aircraft with a camera during a flight movement of the aircraft, the method comprising:
providing the control unit of claim 1;

progressively determining the camera position and real time alignment information of an optical camera axis under control of the control unit; and capturing an aerial image series under control of the control unit, wherein:

for each aerial image of the aerial image series, the capture of the respective aerial image is triggered:

as the aircraft flies through a respective image triggering region, wherein the location of the respective image triggering region is determined at least by in each case a triggering position, which is associated with the respective image triggering region, in a flight plan, and in dependence on the real time alignment of the camera axis during the flight through the respective image triggering region in regard to a fulfillment of a defined maximum angle deviation with respect to a predetermined spatial alignment.

17. A system comprising:
a camera;
a sensor unit configured for progressively determining a camera position and a real time alignment of an optical camera axis of the camera; and
a memory device configured for providing flight plan data for an unmanned aircraft,
a control unit for use in the unmanned aircraft during an aerial image capture flight, wherein:
the control unit is configured to:
obtain camera position information from the sensor unit;
obtain alignment information from the sensor unit; and
obtain the flight plan data for the unmanned aircraft having the control unit from the memory device; and
generate control signals for controlling the camera of the unmanned aircraft for aerial image capture such that the capture of each aerial image of an aerial image series is triggered in a manner controlled based on the control signals:
if a camera position derivable from the position information is present inside a respective image triggering region derivable from the flight plan data, wherein the location of the respective image triggering region is determined in each case at least by a triggering position, which is associated with the respective image triggering region, according to the flight plan data, and
in dependence on the real time alignment of the optical camera axis, which is derivable from the alignment information, in regard to a fulfillment of a defined maximum angle deviation (a) with respect to a predetermined spatial alignment;

wherein:
the position information and the real time alignment information is determined and provided by the sensor unit,
the flight plan data is provided by the memory device, and
the camera is activated by the control signals, which is generated by the control unit, for the aerial image capture, wherein no image is captured if the real time alignment is not within the defined maximum angle deviation (α).

18. An unmanned and controllable aircraft, having a system as claimed in claim 17, wherein:
the sensor unit comprises a GNSS receiving unit and inertial measuring unit.

19. An unmanned and controllable aircraft, having a system as claimed in claim 17, wherein:
by an aerial image capture functionality such that, during the execution thereof, controlled by the control unit during a flight movement of the aircraft, a capture of at least one aerial image is triggered:
as the aircraft flies through an image triggering region, wherein the location of the image triggering region is determined at least by a triggering position, which is associated with the image triggering region, in a flight plan, and
in dependence on the alignment of the camera axis during the flight through the image triggering region in regard to a fulfillment of a defined maximum angle deviation (a) with respect to a predetermined spatial alignment.

20. A computer program product having program code which is stored on a computer-readable non-transitory storage medium carrier, when executed by a processor causes the processor to perform the following steps for an unmanned aircraft with a camera having a optical camera axis:
progressively obtaining:
position information,
real time alignment information of the optical camera axis, and
flight plan data,
and
controlling an aerial image capture by the camera in dependence on the position information, the real time alignment information, and the flight plan data, wherein the aerial image capture occurs in dependence on an alignment and position of the camera and wherein no image is captured if the real time alignment is not within a defined maximum angle deviation (α).

* * * * *